United States Patent [19]

Matsuo et al.

[11] Patent Number: 4,888,242
[45] Date of Patent: Dec. 19, 1989

[54] GRAPHITE SHEET MATERIAL

[75] Inventors: Koichiro Matsuo, Osaka; Kazuhiro Maekawa, Kawanishi; Teruhisa Kondo, Toyonaka, all of Japan

[73] Assignee: Toyo Tanson Co., Ltd., Osaka, Japan

[21] Appl. No.: 53,645

[22] Filed: May 26, 1987

[30] Foreign Application Priority Data

| May 27, 1986 | [JP] | Japan | 61-121893 |
| Jul. 11, 1986 | [JP] | Japan | 61-164317 |
| Aug. 8, 1986 | [JP] | Japan | 61-186662 |

[51] Int. Cl.⁴ .......................... B32B 9/00; B32B 3/25; B32B 3/30; H05B 6/16
[52] U.S. Cl. .................................. 428/408; 428/181; 428/182; 428/183; 428/184; 428/185; 428/186; 428/337; 264/30; 373/45; 373/72; 373/118; 373/122; 373/157; 373/163; 422/248; 423/448
[58] Field of Search ............... 428/337, 408, 181–186; 423/445, 448; 264/30; 501/99; 422/248; 373/45, 72, 118, 122, 137, 155, 156, 157, 163, 164; 156/DIG. 83, 620.76

[56] References Cited

U.S. PATENT DOCUMENTS

| 3,404,061 | 10/1968 | Shane et al. | 428/143 |
| 4,244,934 | 1/1981 | Kondo et al. | 423/448 |
| 4,356,152 | 10/1982 | Berkmen et al. | 428/408 X |
| 4,401,706 | 8/1983 | Sovilla | 428/186 X |
| 4,454,190 | 6/1984 | Katagiri | 428/408 X |

FOREIGN PATENT DOCUMENTS

| 111296 | 7/1982 | Japan . |  |
| 150002 | 8/1984 | Japan | 428/182 |
| 118618 | 6/1985 | Japan . |  |

*Primary Examiner*—Ellis P. Robinson
*Assistant Examiner*—Susan S. Rucker
*Attorney, Agent, or Firm*—Armstrong, Nikaido, Marmelstein, Kubovcik & Murray

[57] ABSTRACT

A refractory heat-insulating graphite sheet material characterized in that the material comprises a graphite sheet.

12 Claims, 3 Drawing Sheets

FIG.1
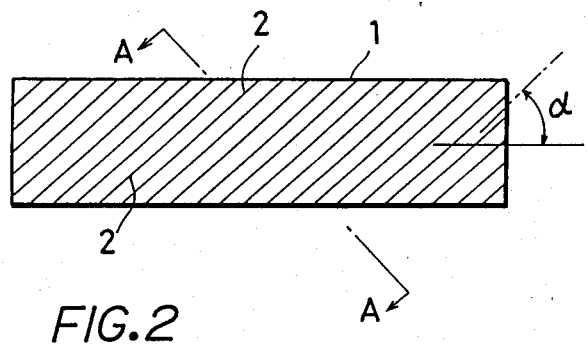
FIG.2
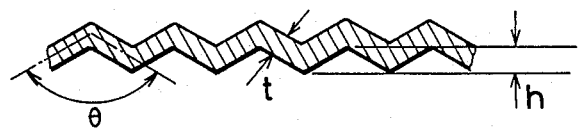
FIG.3
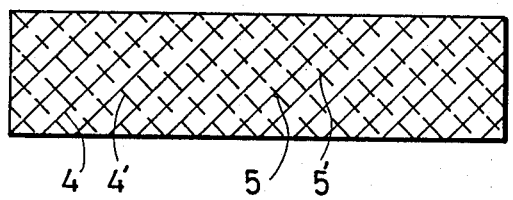
FIG. 4
FIG.5
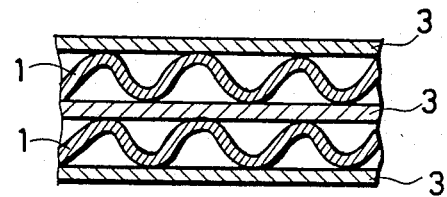

GRAPHITE SHEET MATERIAL

The present invention relates to a graphite sheet material, and more particularly to a graphite sheet material which is useful as a protective material having excellent refractory and heat-insulating properties for use at high temperatures, for example, in high-temperature furnaces and the like.

Graphite sheet materials, which are usually used for gaskets or the like, are in limited use. The present inventor has conducted intensive research to provide such graphite sheet materials which are usable for wider application and consequently developed a graphite sheet material, especially one prepared from expanded graphite, well-suited to use at high temperatures in various fields, for example, as a protective material for high-temperature furnaces including metal or glass melting furnaces, baking furnaces and incinerators, as a protective covering material for high-temperature piping systems, as a protective material for graphite crucibles, and as a refractory heat-insulating protective material for ceramics sintering furnaces. Thus, the present invention has been accomplished.

Stated more specifically, the present invention provides a refractory, heat-insulating graphite sheet material which is characterized in that the material comprises a graphite sheet.

BRIEF DESCRIPTION OF THE DRAWINGS

FIG. 1 is a plan view of a graphite sheet.

FIGS. 2(A), 2(B) and 2(C) are schematic representations of the wave patterns along the line A–A' of FIG. 1 which may be provided to the graphite sheet.

FIG. 3 is a sectional view taken along the line A–A' of FIG. 1.

FIG. 4 is a plan view of an alternative embodiment of the invention.

FIG. 5 is a sectional view of an alternative embodiment of the invention.

Figure 6:
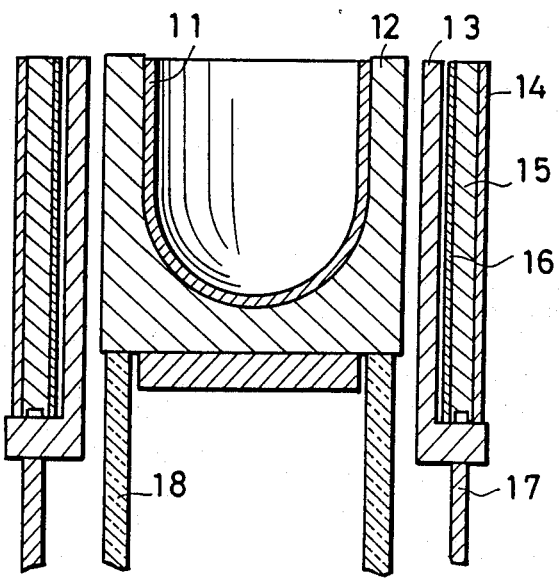
FIG. 6 is a sectional view of a silicon drawing-up device for producing semiconductors.

The graphite sheet material of the present invention is in the form of a sheet prepared from graphite. Examples of useful graphites are usual graphite and expanded graphite. Usual graphite is one which is known as such. Expanded graphite will be described below. This type of graphite is produced from natural or synthetic flaky graphite, kish graphite or the like by treating the graphite with an oxidizing agent to form an interlayer compound between the graphite layers constituting graphite particles, and subsequently heating the graphite at a high temperature, preferably exposing the graphite to a high temperature abruptly, to rapidly expand the graphite. This process expands the graphite particles perpendicularly to the plane of the layer thereof to rapidly increase the volume thereof usually about 100 to about 250 times. The oxidizing agent to be used is one capable of forming an interlayer compound, for example, a mixture of sulfuric acid and nitric acid, or a mixture of sulfuric acid and an oxidizing agent, such as sodium nitrate or potassium permanganate. The oxidizing agent is used in an amount capable of forming the interlayer compound, usually in an amount of 0.01 to 100 parts by weight, preferably about 0.4 to 40 parts by weight, per 100 parts by weight of graphite The treated graphite is then heated to a high temperature of at least 500° C., preferably about 600° to about 1000° C.

Impurities are subsequently removed from the expanded graphite to reduce the impurity contend thereof to not higher than 100 ppm, preferably not higher than 50 ppm. The expanded graphite is thereafter made into a sheet by suitable means, for example, by compression or roll forming. When required, projections (indentations) are further formed on the sheet.

In this way, the sheet material of the invention is prepared from graphite, preferably expanded graphite, and therefore has the following outstanding features.

(i) The material is flexible and high in compressability and restorability or recovery.

(ii) The material has very high heat conductivity in directions parallel with the plane thereof like carbon for electrical uses, whereas in the direction of thickness, the heat conductivity is as low as about 1/30 of the above value, and the gas permeability is also extremely low. Thus, the material is highly anisotropic.

(iii) The material has self-lubricity, which acts to assist in displacement of articles due to expansion or contraction.

Because of these various characteristics, the graphite sheet of the invention exhibits the following excellent properties when used as a refractory heat-insulating material.

(iv) The material is useful for assuring a uniform temperature distribution and also serves to mitigate thermal impact and to diminish expansion and contraction stresses between different materials due to differences in coefficient of expansion.

(v) The minute graphite particles constituting the sheet material are arranged along a plane, so that the sheet material is highly resistant to the flow of gas therethrough and is therefore useful for high-temperature apparatus for preventing harmful gas or the like thereby released from contaminating the material to be heated.

(iv) The material is very low in impurity content and therefore will not soil other materials or articles Generally, the graphite sheet material of the present invention is useful insofar as it is in the form of a sheet. However, it is desirable that the material be shaped variously as will be described below. For example, the present sheet material can be in wavelike forms as shown in FIGS. 1 to 3. FIG. 1 is a plan view of a sheet material 1 having the waveform of FIG. 2 (a) and ridgelines 2. FIG. 2 schematically shows various waveforms. FIG. 3 is a sectional view showing an example of waveform on an enlarged scale. The graphite sheet material is not limited specifically in waveform. For example, when seen in section perpendicular to the ridgelines of waves, i.e. along the line A—A' in FIG. 1, the sheet material may have a saw-toothed triangular waveform, sinusoidal waveform or distorted waveform having a specified wave pitch as seen in FIG. 2 (a), (b) or (c), respectively, insofar as the waveform has straight ridgelines arranged at a predetermined spacing. However, to reduce the area of contact between superposed sheets, it is desirable that the sheer material have a triangular waveform as seen in FIG. 3. With reference to FIG. 3, the vertex angle θ, wave pitch, wave height h, etc. may be determined suitably in accordance with the contemplated use. Especially, it is desirable that the wave height h be 1.5 to 2.5 times the thickness t of the graphite sheet material.

As another form of sheet material of the invention, the material may have a surface formed with projections or indentations by embossing. Although the height of projections is noc limited specifically, it is preferably about 1.5 to about 2.5 times the thickness t of the sheet.

When having such an waveform or embossed surface, the sheet material is given enhanced stretchability to accommodate some dimensional differences and to intimately fit to the portion of material to which the present material is applied, exhibiting improved heat-insulating properties and effectively acting to mitigate thermal or mechanical impact and to absorb the stress resulting from the difference in coefficient of expansion between the graphite and the portion or material covered with the graphite sheet material.

Further alternatively, the graphite sheet material is locally cut out and shaped to conform to a circular or curved form. The size of such cutouts may be suitably determined in accordance with the configuration, especially the curvature, of the curved portion to be covered with the present material.

Typically, the graphite sheet material of the invention is in a waveform having bias waves. The material of this type will be described below in greater detail with reference to FIGS. 1 to 3.

FIG. 1 shows a graphite sheet 1 having bias waves at an angle of inclination, α, with respect to the lengthwise direction thereof. The inclination angle α is not limited specifically but is suitably variable over
the range of 0 to 90 degrees. Preferably, the angle is about 30 to 60 degrees. The thickness t of the sheet, which is suitably determined according to the contemplated use, is usually about 0.1 to about 1.0 mm.

The sheet material of the present invention may be used as it is, while it is preferable to use the sheet, for example, in the following modes.

At least two waved graphite sheets are used as superposed on each other, with their crests or furrows displaced from each other. This effectively prevents erosion by a material which is likely to melt at high temperatures, further precluding the resulting objectionable reaction.

Bias-waved graphite sheets 1 and planar sheets 3 may be arranged alternately in layers as seen in FIG. 5. Further alternatively, a pluarlity of bias-waved sheets may be arranged in layers with the direction of inclination of bias waves reversed alternately, i.e. with every other sheet turned rear side up as seen in FIG. 4, and made into a laminate. With this laminate, the crests 4 Of one sheet intersect the crests 4' of another sheet immediately adjacent thereto, and the two sheets are in contact with each other at the intersections 5, 5', . . . of the ridgelines of the waves. Thus, many contact points 5, 5', . . . of very small area are uniformly distributed throughout the laminate.

In view of the structural strength and shape retentivity or stability, the acute angles between the intersecting ridgelines of adjacent sheets are preferably in the range of 10 to 90 degrees, more preferably closer to 90 degrees. For the same reason, the acute angle of inclination, α, of the bias waves with the lengthwise direction of the sheet is preferably 30 to 85 degrees, most preferably 45 degrees.

The sheets to be laminated need only be so arranged that the waves of each two adjacent sheets are inclined in directions opposite to each oter. While the two sheets may differ in the angle of inclination without any particular objection, it is desirable that the sheets have the same angle of inclination of waves and be laminated with the direction of inclination reversed alternately from sheet to sheet, in view of ease of manufacture and structural balance of the laminate.

The graphite sheets of the present invention are usable for wide application as refractory and/or heat insulating materials and are especially suited for use as refractory heat-insulating protective materials for high-temperature furnaces. The sheet material of the invention is also useful for protecting the graphite material of graphite crucibles or the like, for example, for protecting the graphite crucible of a device for drawing up a single crystal. This application will be described in detail below.

FIG. 6 shows a silicon drawing-up device for producing semiconductors as a typical example of single crystal drawing-up device. The drawing shows a quartz crucible 11, graphite crucible 12, graphite heater 13, graphite protector 14, graphite cloth protector 15, quartz member or insulation 16, electrode 17 and crucible support 18.

It is required for such a device to produce a greater single crystal, and to meet this requirement, there is a tendency to use a larger graphite crucible and a larger quartz crucible. A problem has heretofore been encountered with devices of this type. When molten silicon remains in the quartz crucible, the melt breaks the quartz crucible on solidification, or the interior surface of the crucible is locally converted to a silicon carbide layer due to thermal impact or to the reaction of the melt with the quartz crucible, consequently breaking the graphite crucible due to a difference in coefficient of expansion. This problem becomes more pronounced with the use of larger crucibles.

Figure 7A:
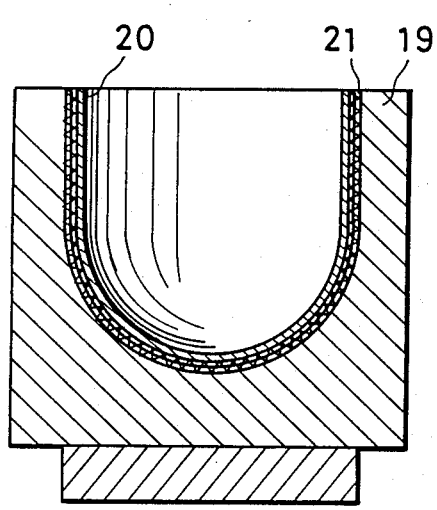
FIG. 7A is a cross-sectional view of a graphite crucible.
Figure 7B:
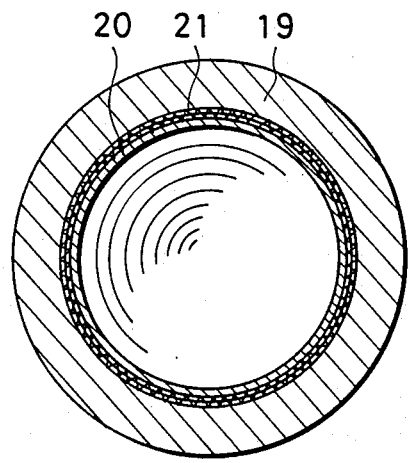
FIG. 7B is a plan view of the crucible of FIG. 7A.

The problem can be overcome by interposing the graphite sheet material of the present invention between the graphite and quartz crucibles in conformity with the configuration of the crucibles. Stated more specifically with reference to FIG. 7 (a) showing a graphite crucible 19 and a quartz crucible 20 placed therein, a graphite sheet material 21 conforming to the shape of these crucibles is interposed between the crucibles. FIG. 7(b) is a cross sectional view of FIG. 7 (a). The method of interposing the sheet material 21 is not limited specifically provided that the sheet can be positioned between the crucibles in conformity with the shape thereof. The sheet material can be provided between the cylindrical portions of the crucibles, for example, by winding the material 21 around the Outer periphery of the quartz crucible 20 or applying the material 21 to the inner surface of the graphite crucible 19 before the crucible 20 is placed into the crucible 19. Further the material 21 can be provided between the spherical portions of crucibles by laying small pieces of the material 21 over the bottom portion of the crucible 19 before the crucible 20 is placed thereinto.

The use of the graphite sheet material of the present invention for protecting the crucibles results in the following advantages. The sheet material assures a uniform temperature distribution vertically of the crucibles, mitigates thermal impact and diminishes the expansion and contraction stresses due to the difference between quartz and graphite in coefficient of expansion.

The minute constituent particles of the sheet material are arranged along a plane, act against the passage of gas and effectively prevent the reaction between the quartz and graphite crucibles. Further the sheet material is extremely low in impurity content and therefore will not contaminate the substance within the crucible.

The graphite sheet material nevertheless is not particularly greater than metallic materials in ductility and is therefore somewhat inferior in workability. For example, some problems are encountered in shaping the sheet material in a curved form.

According to the invention, therefore, it is desirable to pre-shape the material so that it can be interposed between the crucibles properly with ease. For example, it is desirable to shape the sheet material in a waveform as already described. The waveform enables the sheet material to accommodate some dimensional differences by virtue of the stretching or contraction of its crests or furrows and to come into intimate contact with the crucible surfaces, exhibiting enhanced heat-insulating properties, mitigating thermal or mechanical impact and absorbing the stress due to the difference between quartz and graphite in coefficient of expansion.

Figure 8:
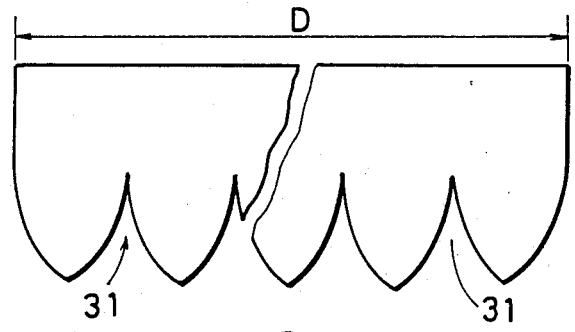
FIG. 8 is a graphite sheet having cutouts adapted to form a crucible.

Alternatively, cutouts 31 are formed in the lower end of the graphite sheet as illustrated in FIG. 8 to shape a spherical bottom portion in conformity with the configuration of the crucible bottom portions. The size, etc. of such cutouts 31 are suitably determined according to the shape of the crucibles, especially the curvature of their bottom portions. Indicated at D in FIG. 8 is the circumference of the graphite crucible.

Further at least two superposed graphite sheets thus cut may be used with the cutouts of one sheet displaced from those of the other sheet.

Figure 9:
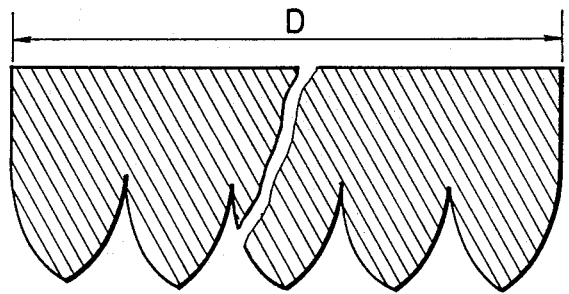
FIG. 9 is a waved graphite sheet having cutouts adapted to form a crucible.

FIG. 9 shows a waved graphite sheet having like cutouts. A plurality of such sheets may be arranged in layers, with the waves of one sheet intersecting those of another sheet adjacent thereto, and made into a laminate for use between the crucibles.

The features of the present invention will be described below in greater detail with reference to the following examples and comparative examples.

EXAMPLE 1

Natural flaky graphite was treated with a mixture of concentrated sulfuric acid and nitric acid (100:6 in ratio by weight), washed with water, dried and then heated in an electric oven at 850° C. for 30 seconds to obtain expanded graphite having a bulk density of about 0.003 g/cm$^3$.

The expanded graphite was then made by a press into an elongated sheet as shown in FIG. 1 and having a triangular waveform as shown in FIG. 3. The specifications of the sheet were: t=0.35 mm, h=0.70 mm, $\theta$=45 degrees and $\alpha$=45 degrees. The sheet was then cut into the shape shown in FIG. 8. when analyzed, the sheet was found to have an ash content of 15 ppm.

The cut sheet was provided between the quartz crucible and the graphite crucible of the device shown in FIG. 6 and tested for the durability of the crucibles.

The result is shown in Table 1, which also shows the result achieved in the absence of the protective sheet.

TABLE 1

|  | Temp. (°C.) | Durability (runs) |
|---|---|---|
| Without graphite sheet | 1650 | 25–30 |
| With graphite sheet | 1650 | 42–45 |

EXAMPLE 2

Two waved graphite sheets, the same as the one prepared in Example 1, were superposed on each other with the ridgelines of the front sheet intersecting those of the rear sheet. The assembly was thereafter treated and tested in the same manner as the sheet of Example 1. The result is given in Table 2, which also shows the result achieved in the absence of the protective graphite sheet.

TABLE 2

|  | Temp. (°C.) | Durability (runs) |
|---|---|---|
| Without graphite sheet | 1650 | 25–30 |
| With graphite sheet | 1650 | 52–57 |

EXAMPLE 3

The same graphite sheet as the one prepared in Example 1 was used as interposed between a crucible for melting optical glass and the heat-insulating portion of a refractory brick layer forming an outer wall for the crucible, the sheet being provided around the crucible. The sheet exhibited outstanding refractory and heat-insulating properties.

EXAMPLE 4

Two waved graphite sheets, the same as the one prepared in Example 1, were superposed on each other with the wave crests of the front sheet displaced from those of the rear sheet. When used in the same manner as in Example 3, the graphite sheet assembly exhibited outstanding refractory and heat-insulating properties.

EXAMPLE 5

Figure 10:
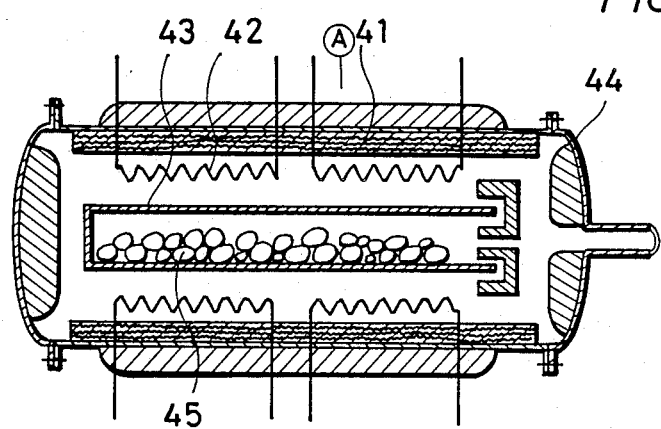
FIG. 10 is a side elevation, sectional view of a sintering furnace.

The same graphite sheet assembly as the one prepared in Example 4 was used for a ceramic sintering furnace incorporating a resistance heat generator. FIG. 10 is a side elevation in section schematically showing the furnace, which comprises a heat-insulating member 41, the resistance heat generator 42, a graphite container 43 and a reactor 44. Indicated at 45 is the ceramic material to be sintered. The sheet assembly was rolled into a tube, which was used as the heat-insulating member 41.

Although asbestos wool conventionally used for the heat-insulating member is low in heat-resistant temperature, while the refractory brick lining is costly to construct, the assembly of waved sheets of the invention exhibited satisfactory durability and heat insulating properties in a vacuum of 40 to 50 torr at an operating temperature of 2000° C.

What is claimed is:

1. A refractory heat-insulating graphite sheet material characterized in that the material comprises an expanded graphite sheet having an impurity content of not higher than 100 ppm.

2. A graphite sheet material as defined in claim 1 which is a refractory heat-insulating sheet for high-temperature furnaces.

3. A graphite sheet material as defined in claim 1 wherein the graphite sheet has a thickness of 0.20 to 1.00 mm.

4. A graphite sheet material as defined in claim 1 which is in a bias waveform having wave ridgelines extending at an angle of inclination with respect to the lengthwise direction of the material.

5. A graphite sheet material as defined in claim 1 which has bias-waved opposite surfaces.

6. A graphite sheet material as defined in claim 1 which is prepared by treating flaky graphite with an oxidizing agent to form an interlayer compound between layers of graphite particles, heating the treated graphite at a high temperature to expand the graphite and forming the expanded graphite into a sheet.

7. A graphite sheet material as defined in claim 1 which comprises at least two sheets of the graphite sheet material having bias-waved opposite surfaces which are superposed on each other, wherein wave ridgelines of one of the sheets are inclined in an opposite direction to and intersect wave ridgelines of the other sheet.

8. A graphite sheet material as defined in claim 1 in which sheets of graphite material having bias-waved opposite surfaces and planar sheets are arranged alternately in layers.

9. A graphite sheet material for protecting graphite crucibles characterized in that the material comprises the graphite sheet defined in claim 1 or 6.

10. A graphite sheet material as defined in claim 8 wherein the graphite sheet is 0.20 to 1.00 mm in thickness and precut in predetermined dimensions to conform to a specified shape and to be insertable into a clearance between a graphite crucible and a quartz crucible.

11. A graphite sheet material as defined in claim 1 wherein the impurity content of the graphite sheet is not higher than 50 ppm.

12. A crucible structure comprising,
a graphite inner layer,
a quartz outer layer, and
the refractory heat-insulating graphite sheet material of claim 1, said refractory sheet being interposed between the graphite outer layer and the quartz inner layer and being in conformity with the configuration of the graphite outer layer and the quartz inner layer.

* * * * *

UNITED STATES PATENT AND TRADEMARK OFFICE
CERTIFICATE OF CORRECTION

PATENT NO. : 4,888,242

DATED : December 19, 1989

INVENTOR(S) : MATSUO et al

It is certified that error appears in the above-identified patent and that said Letters Patent is hereby corrected as shown below:

On the cover page, Item [73], "Tanson" should read --Tanso--.

Signed and Sealed this

Thirtieth Day of July, 1991

Attest:

HARRY F. MANBECK, JR.

*Attesting Officer*  *Commissioner of Patents and Trademarks*